United States Patent
Li et al.

(10) Patent No.: US 11,275,881 B1
(45) Date of Patent: Mar. 15, 2022

(54) SYSTEM, METHOD, AND COMPUTER PROGRAM PRODUCT FOR GENETIC ROUTING IN AN ELECTRONIC CIRCUIT DESIGN

(71) Applicant: Cadence Design Systems, Inc., San Jose, CA (US)

(72) Inventors: Weifu Li, San Jose, CA (US); Elias Lee Fallon, Allison Park, PA (US); Supriya Ananthram, Los Gatos, CA (US); Weiyi Qi, Santa Clara, CA (US); Sheng Qian, Sunnyvale, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/140,510

(22) Filed: Jan. 4, 2021

(51) Int. Cl.
*G06F 30/3947* (2020.01)
*G06F 30/398* (2020.01)
*G06F 30/31* (2020.01)
*G06F 111/06* (2020.01)

(52) U.S. Cl.
CPC .......... *G06F 30/3947* (2020.01); *G06F 30/31* (2020.01); *G06F 30/398* (2020.01); *G06F 2111/06* (2020.01)

(58) Field of Classification Search
CPC ................ G06F 30/3947; G06F 2111/06
USPC .................................................. 716/126
See application file for complete search history.

(56) References Cited

U.S. PATENT DOCUMENTS 7,904,848 B2 * 3/2011 Coene .................. G06F 9/5066
716/126

* cited by examiner

*Primary Examiner* — Eric D Lee
(74) *Attorney, Agent, or Firm* — Mark H. Whittenberger, Esq.; Holland and Knight LLP

(57) ABSTRACT

The present disclosure relates to a computer-implemented method for electronic design is provided. Embodiments may include receiving, using at least one processor, an electronic design having one or more unoptimized nets. Embodiments may further include applying a genetic algorithm to the electronic design, wherein the genetic algorithm includes a multi-stage routing analysis. A first stage analysis may apply a device-level global routing analysis, a second stage analysis may include an intra-row routing analysis, a third stage may include an inter-row routing analysis, and a fourth stage may include a post-routing optimization analysis. Embodiments may also include generating an optimized routing of the one or more unoptimized nets and displaying the optimized routing at a graphical user interface.

20 Claims, 29 Drawing Sheets or

1800

2200

Track Mutation

| Instream | D0_G | D1_S | D1_D | D0_S | D2_S | D1_G | D2_G |
|---|---|---|---|---|---|---|---|
| Track_Num | 0 | 2 | 3 | 1 | 4 | 2 | 0 |

| Instream | D0_G | D1_S | D1_D | D0_S | D2_S | D1_G | D2_G |
|---|---|---|---|---|---|---|---|
| Track_Num | 0 | 2 | 5 | 1 | 4 | 2 | 0 |

Assuming 7 tracks totally, since the instream S and G of device D take track 4 and 2 respectively, the available track for D would be {5, 6} and randomly pick one.

Order Mutation

| Instream | D0_G D1_S | D1_D D2_S | D0_S D1_G D2_G | D0_S D1_G D2_G | D0_S D1_G D2_G | D1_D D2_S | D0_G D1_S |
|---|---|---|---|---|---|---|---|
| Order | 0 | 1 | 2 | 0 | 3 | 4 | 5 |

| Instream | D0_G D1_S | D0_S D1_G D2_G | D0_S D1_G D2_G | D0_S D1_G D2_G | D1_D D2_S | D0_G D1_S |
|---|---|---|---|---|---|---|
| Order | 1 | 2 | 0 | 3 | 5 | 4 |

| Int(grnt) | D0_G | D1_S | D2_D | D1_S | D2_S | D3_G | D2_G |
|---|---|---|---|---|---|---|---|
| Parent 0 Track_Num | 0 | 2 | 3 | 1 | 4 | 2 | 0 |

| Int(grnt) | D0_G | D1_S | D2_D | D1_S | D2_S | D3_G | D2_G |
|---|---|---|---|---|---|---|---|
| Parent 1 Track_Num | 1 | 4 | 2 | 5 | 2 | 0 | 3 |

| Int(grnt) | D0_G | D1_S | D2_D | D1_S | D2_S | D3_G | D2_G |
|---|---|---|---|---|---|---|---|
| Child 0 Track_Num | 0 | 4 | 2 | 5 | 2 | 2 | 0 |

| Int(grnt) | D0_G | D1_S | D2_D | D1_S | D2_S | D3_G | D2_G |
|---|---|---|---|---|---|---|---|
| Child 1 Track_Num | 1 | 2 | 3 | 1 | 4 | 0 | 3 |

FIG. 23

| Index | D0_C | D1_S | D2_C | D3_S | D4_S | D5_C | D6_S |
|---|---|---|---|---|---|---|---|
| Track_Num | 0 | 2 | 3 | 0 | 4 | 2 | 1 |

| Index | D0_C | D1_S | D2_C | D3_S | D4_S | D5_C | D6_S |
|---|---|---|---|---|---|---|---|
| Track_Num | 0 | 2 | 5 | 1 | 3 | 2 | 1 |

Device D2 (spanning D2_C, D3_S, D4_S)

Track Mutation

Assuming 7 tracks totally. All the Insterms in device D2 are re-assigned.

| | Insight | D0_G | D0_S | D0_D | D1_S | D1_D | D2_S | D2_D | D2_G | D1_D | D1_S |
|---|---|---|---|---|---|---|---|---|---|---|---|
| Parent 0 | Track_Num | 0 | 2 | 3 | 1 | 4 | 2 | 2 | 6 | 2 | 0 |
| Parent 1 | Track_Num | 1 | 4 | 2 | 5 | 2 | 0 | 2 | 1 | 2 | 6 |
| Child 0 | Track_Num | 0 | 2 | 3 | 5 | 2 | 0 | 2 | 6 | 2 | 0 |
| Child 1 | Track_Num | 1 | 4 | 2 | 1 | 4 | 2 | 2 | 1 | 2 | 6 |

SYSTEM, METHOD, AND COMPUTER PROGRAM PRODUCT FOR GENETIC ROUTING IN AN ELECTRONIC CIRCUIT DESIGN

GOVERNMENT RIGHTS

This invention was made with Government support under Agreement No. HR0011-18-3-0010, awarded by DARPA. The Government has certain rights in the invention.

FIELD OF THE INVENTION

The present disclosure relates to electronic circuit design, and more specifically, to analog and mix-signal circuit routing using genetic algorithms.

DISCUSSION OF THE RELATED ART

In existing electronic circuit design systems it may be possible to operate upon analog and mix-signal layouts. It is challenging to automatically route all nets at the graphical user interface of existing design tools to meet electrical performance and speed requirements.

SUMMARY

In one or more embodiments of the present disclosure, a computer-implemented method for electronic design is provided. The method may include receiving, using at least one processor, an electronic design having one or more unoptimized nets. The method may further include applying a genetic algorithm to the electronic design, wherein the genetic algorithm includes a multi-stage routing analysis. A first stage analysis may apply a device-level global routing analysis, a second stage analysis may include an intra-row routing analysis, a third stage may include an inter-row routing analysis, and a fourth stage may include a post-routing optimization analysis. The method may also include generating an optimized routing of the one or more unoptimized nets and displaying the optimized routing at a graphical user interface.

One or more of the following features may be included. In some embodiments, the device-level global routing analysis includes a router that represents a routing of a layout of the electronic design as a series of two point connection pairs. The intra row routing analysis may include a hierarchical routing analysis. The intra row routing analysis may include a first mutation operation for net cluster routing and a second mutation operation for all net routing. The method may further include performing a plurality of device based track assignment operations. The genetic algorithm may include a cost function that includes a track placement penalty associated with a distance or a track placement penalty if one or more extra tracks are generated. At least one of the mutation operations may include a guided mutation operation.

In one or more embodiments of the present disclosure, a system for electronic design is provided. The system may include a computing device having at least one processor configured to perform one or more operations. Operations may include receiving, using at least one processor, an electronic design having one or more unoptimized nets. Operations may further include applying a genetic algorithm to the electronic design, wherein the genetic algorithm includes a multi-stage routing analysis. A first stage analysis may apply a device-level global routing analysis, a second stage analysis may include an intra-row routing analysis, a third stage may include an inter-row routing analysis, and a fourth stage may include a post-routing optimization analysis. Operations may also include generating an optimized routing of the one or more unoptimized nets and displaying the optimized routing at a graphical user interface.

One or more of the following features may be included. In some embodiments, the device-level global routing analysis includes a router that represents a routing of a layout of the electronic design as a series of two point connection pairs. The intra row routing analysis may include a hierarchical routing analysis. The intra row routing analysis may include a first mutation operation for net cluster routing and a second mutation operation for all net routing. Operations may further include performing a plurality of device based track assignment operations. The genetic algorithm may include a cost function that includes a track placement penalty associated with a distance or a track placement penalty if one or more extra tracks are generated. At least one of the mutation operations may include a guided mutation operation.

In yet another embodiment of the present disclosure a non-transitory computer readable medium having stored thereon instructions that when executed by a processor result in one or more operations is included. Operations may include receiving, using at least one processor, an electronic design having one or more unoptimized nets. Operations may further include applying a genetic algorithm to the electronic design, wherein the genetic algorithm includes a multi-stage routing analysis. A first stage analysis may apply a device-level global routing analysis, a second stage analysis may include an intra-row routing analysis, a third stage may include an inter-row routing analysis, and a fourth stage may include a post-routing optimization analysis. Operations may also include generating an optimized routing of the one or more unoptimized nets and displaying the optimized routing at a graphical user interface.

One or more of the following features may be included. In some embodiments, the device-level global routing analysis includes a router that represents a routing of a layout of the electronic design as a series of two point connection pairs. The intra row routing analysis may include a hierarchical routing analysis. The intra row routing analysis may include a first mutation operation for net cluster routing and a second mutation operation for all net routing. Operations may further include performing a plurality of device based track assignment operations. The genetic algorithm may include a cost function that includes a track placement penalty associated with a distance or a track placement penalty if one or more extra tracks are generated. At least one of the mutation operations may include a guided mutation operation.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 22 is a diagram depicting aspects of a multi-stage routing process in accordance with an embodiment of the present disclosure;

FIG. 23 is a diagram depicting aspects of a multi-stage routing process in accordance with an embodiment of the present disclosure;

FIG. 24 is a diagram depicting aspects of a multi-stage routing process in accordance with an embodiment of the present disclosure;

FIG. 25 is a diagram depicting aspects of a multi-stage routing process in accordance with an embodiment of the present disclosure;

DETAILED DESCRIPTION

Figure 1:
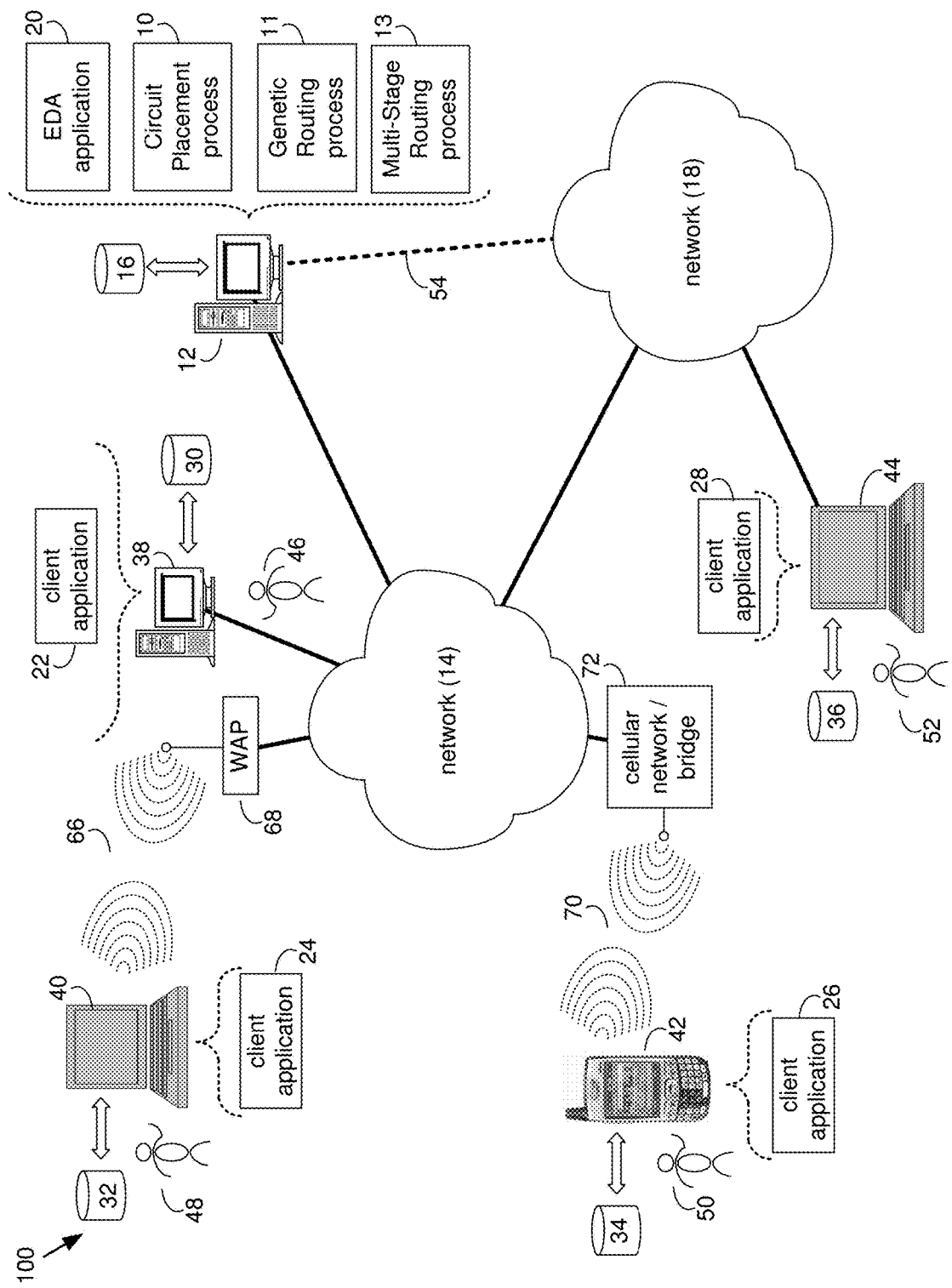
FIG. 1 is a diagram depicting an embodiment of a system in accordance with the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosures. Some hardware description languages may include, but are not limited to, Verilog, VHDL, and Verilog-AMS. Various other hardware description languages may also be used as well.

Referring to FIG. 1, there is shown a circuit placement process 10, a genetic routing process 11, and a multi-stage routing process 13 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the circuit placement process 10, a genetic routing process 11, and a multi-stage routing process 13 may reside on and be executed, in whole or in part, by a client electronic device, such as a personal computer, notebook computer, personal digital assistant, or the like.

The instruction sets and subroutines of circuit placement process 10, a genetic routing process 11, and a multi-stage routing process 13, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (e.g., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Circuit placement process 10, a genetic routing process 11, and a multi-stage routing process 13 may be a stand alone application, or may be an applet/application/script that may interact with and/or be executed within EDA application 20. In addition/as an alternative to being a server-side process, the circuit placement process may be a client-side process (not shown) that may reside on a client electronic device (described below) and may interact with an EDA client application (e.g., one or more of EDA client applications 22, 24, 26, 28). Further, circuit placement process 10, a genetic routing process 11, and multi-stage routing process 13 may be a hybrid server-side/client-side process that may interact with EDA application 20 and an EDA client application (e.g., one or more of client applications 22, 24, 26, 28). As such, the circuit placement process 10, a genetic routing process 11, and multi-stage routing process 13 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize circuit placement process 10, genetic routing process 11, and multi-stage routing process 13.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (e.g., the computer that executes EDA application 20) may be connected to network 14 through secondary network 18, as illustrated with phantom link line 54. Some or all of the operations discussed herein with regard to circuit placement process 10 and genetic routing process 11 may be performed, in whole or in part, in the cloud as a cloud-based process including, for example, networks 14, 18 and any others.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (e.g., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (e.g., CSMA/CA) for path sharing. The various 802.11x specifications may use phase-shift keying (e.g., PSK) modulation or complementary code keying (e.g., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.)

Figure 2:
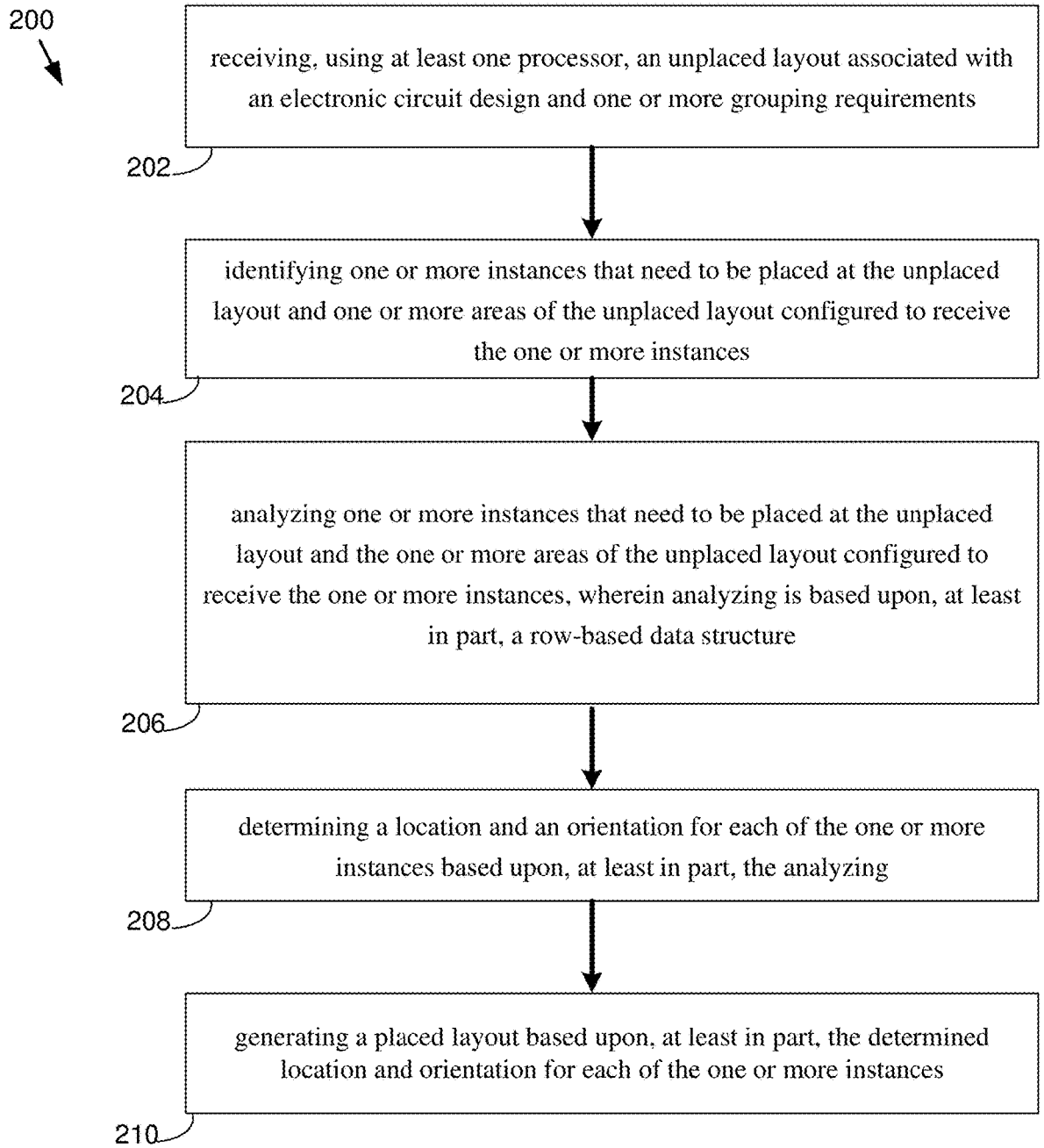
FIG. 2 is a flowchart depicting operations incorporating the circuit placement process in accordance with an embodiment of the present disclosure.

Referring now to FIG. 2, an example flowchart depicting operations consistent with an embodiment of circuit placement process 10 is provided. The process may include receiving (202), using at least one processor, an unplaced layout associated with an electronic circuit design and one or more grouping requirements. Embodiments may also include identifying (204) one or more instances that need to be placed at the unplaced layout and one or more areas of the unplaced layout configured to receive the one or more instances. Embodiments may further include analyzing (206) one or more instances that need to be placed at the unplaced layout and the one or more areas of the unplaced layout configured to receive the one or more instances, wherein analyzing is based upon, at least in part, a row-based data structure. Embodiments may also include determining (208) a location and an orientation for each of the one or more instances based upon, at least in part, the analyzing and generating (210) a placed layout based upon, at least in part, the determined location and orientation for each of the one or more instances.

Figure 3:
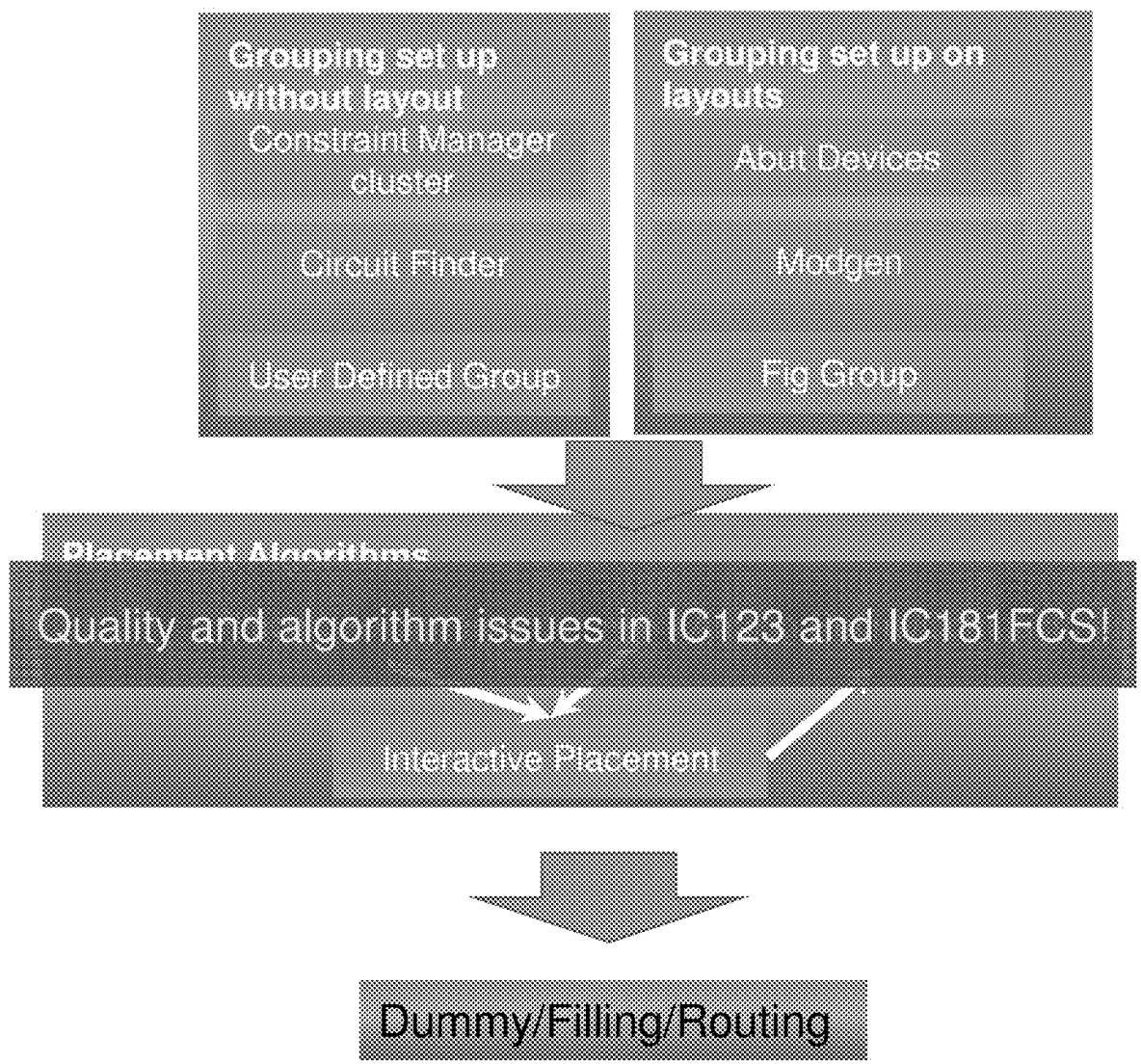
FIG. 3 is a diagram depicting a flowchart in accordance with an embodiment of the present disclosure.

Referring now to FIG. 3, a flowchart depicting example operations associated with analog device placement is provided. In some embodiments, structured devices may need to be grouped together in an analog and mix-signal layout. The device grouping requirements may be imported from any suitable electronic design application. Some of these may include, but are not limited to, constraint manager, module generation, circuit finder or machine learning models, etc. Users may be able to visualize and modify device grouping requirements. The group setup may be stored in a database (e.g. a layout view database, etc.) and may be shared with different algorithms. Users may execute automatic placement algorithms with assisted placement help to finish placement job.

Embodiments of circuit placement process 10 may include an automatic placement algorithm configured to address many of the issues discussed above. In some embodiments, the optimized placement may include a legalized layout without any design rule violations. Device grouping requirements may be input from any suitable locations such as the electronic design applications discussed above. Embodiments of circuit placement process 10 and/or genetic routing process 11 discussed below may operate in conjunction with row template functionality available from electronic design tools of the Assignee of the subject application, however, row template capabilities are not required.

In some embodiments, circuit placement process 10 and/or genetic routing process 11 may analyze one or more quality metrics such as area and wire-length, which may be used to determine the quality of placement results. Circuit placement process 10 may produce one placement with minimum area and one placement with minimum wire length. Users may be provided with one or more user-selectable options to adjust the weight of area and/or wire-length for the optimization trade-off.

Figure 4:
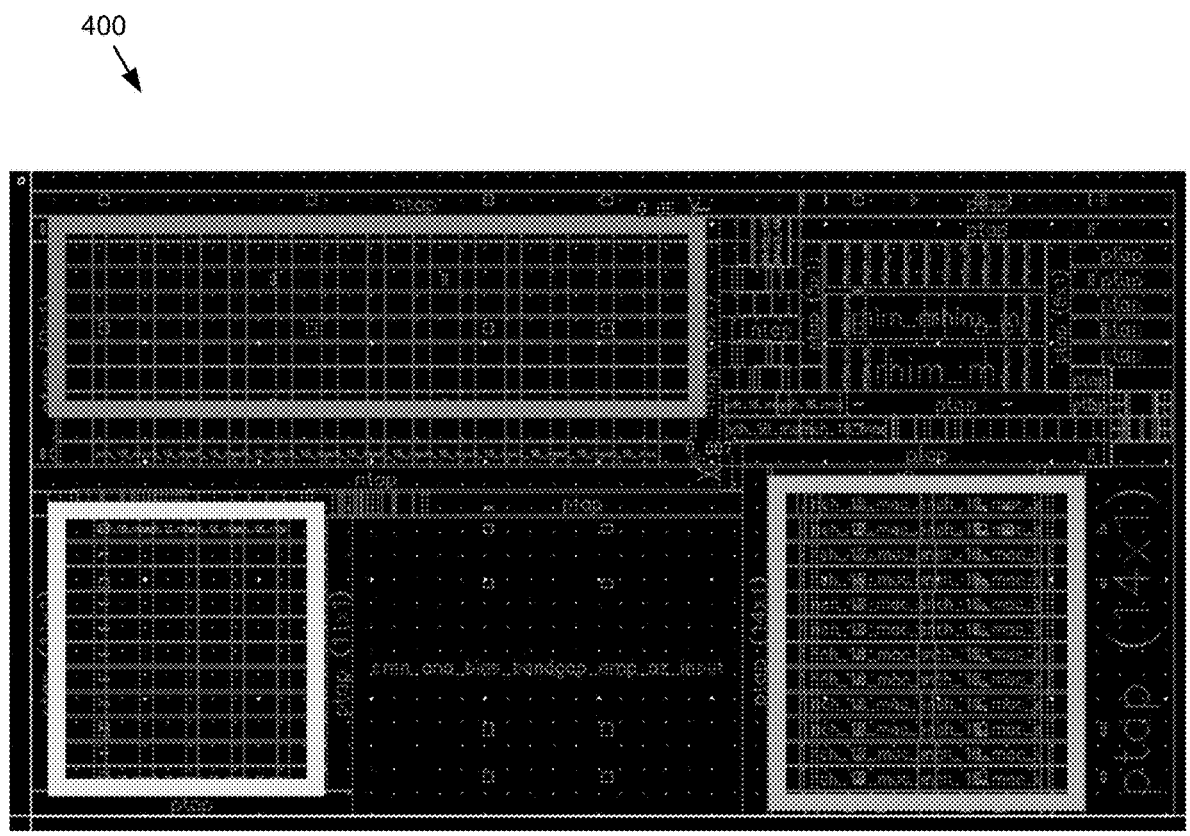
FIG. 4 is a graphical user interface in accordance with an embodiment of the present disclosure.

Referring also to FIG. 4, another graphical user interface illustrating some of the optimization challenges faced by existing approaches is provided. A row styled placement in accordance with the teachings of the present disclosure may be configured to work with or without row templates. Circuit placement process 10 and/or genetic routing process 11 may analyze an existing placement (e.g., schematic, layouts, .txt files, etc.) as a reference placement and optimize both instances and pins placement together during optimization process. Moreover, circuit placement process 10 may optimize the aspect ratio of a group. Each of these concepts are discussed in further detail hereinbelow.

Figure 5:
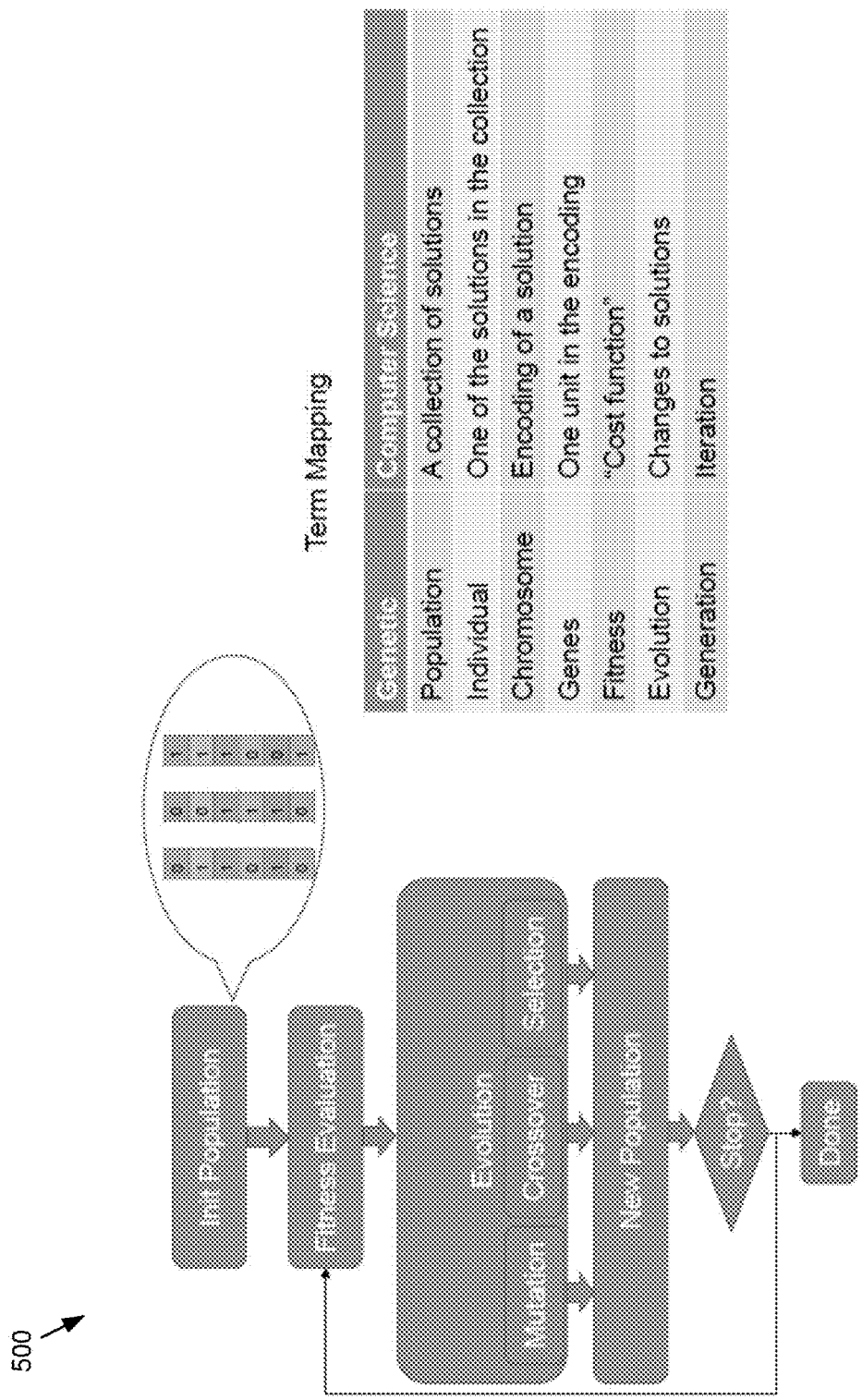
FIG. 5 is a flowchart depicting an example genetic algorithm in accordance with an embodiment of the present disclosure.

Referring now to FIG. 5, a flowchart showing an example genetic algorithm that may be used in accordance with circuit placement process 10 and/or genetic routing process 11 is provided. A genetic algorithm ("GA") generally refers to a bio-inspired or evolutionary algorithm that may be used for optimization and search problems. A GA may simulate the process of natural selection and evolution. The goal is to find the best "fit" individuals or those with the best genes. It should be noted that although certain embodiments included herein may reference genetic algorithms, any analysis process may be used in accordance with the teachings of the present disclosure.

Referring now to FIGS. 6-14, embodiments of a genetic routing process 11 are provided. Genetic routing process 11 may include a fast two-stage router that uses one or more genetic algorithms to optimize track assignment and net order in routing. Embodiments of genetic routing process 11 may utilize any or all of the aspects discussed above with regard to circuit placement process 10. Additionally and/or alternatively, genetic routing process 11 may be configured to operate with any suitable placement engine in addition to those described above.

Figure 6:
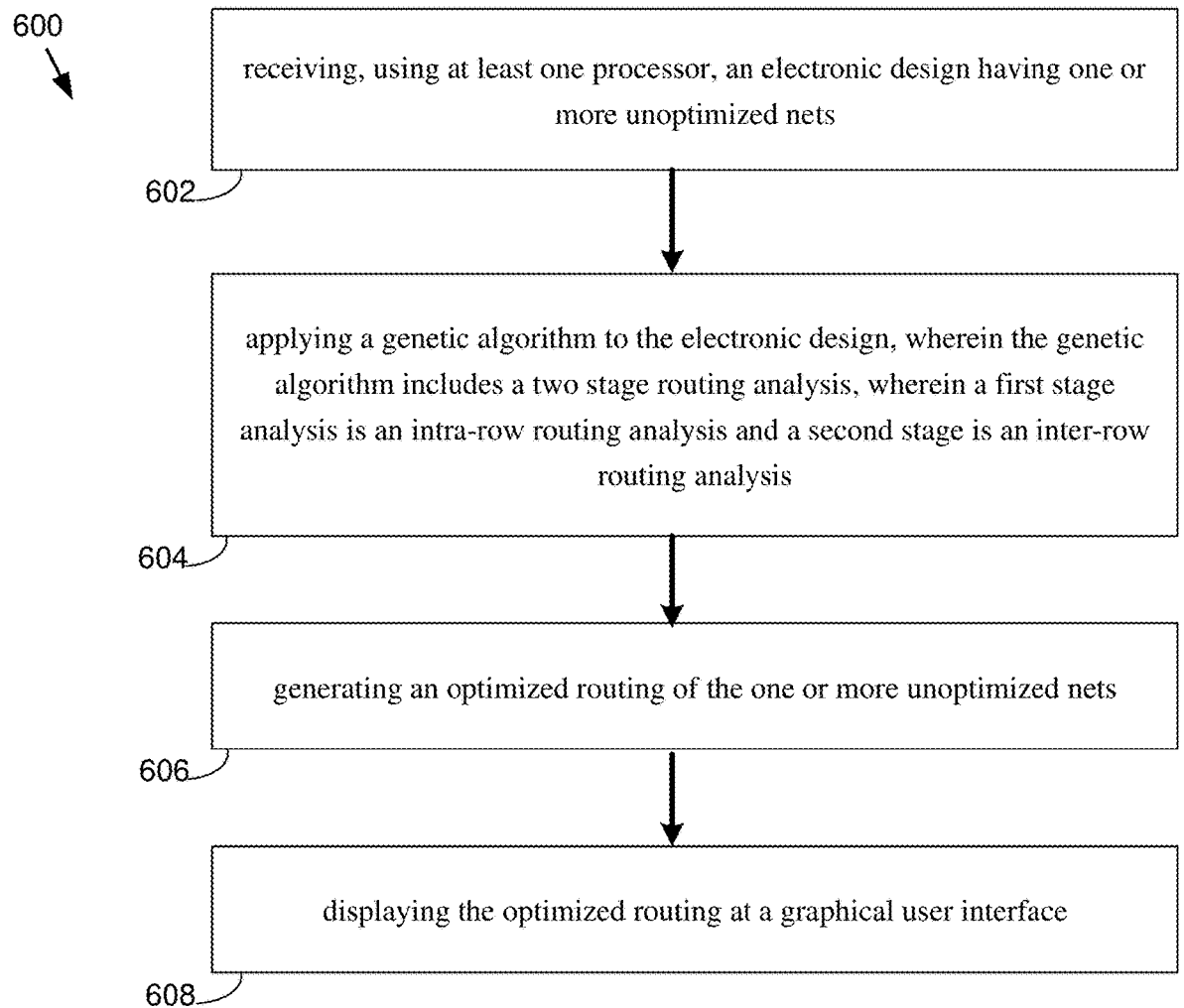
FIG. 6 is a diagram depicting aspects of a genetic routing process in accordance with an embodiment of the present disclosure.

Referring to FIG. 6, a flowchart including operations consistent with an embodiment of genetic routing process 11 is provided. The process may include receiving (602), using at least one processor, an electronic design having one or more unoptimized nets. The process may further include applying (604) a genetic algorithm to the electronic design, wherein the genetic algorithm includes a two-stage routing analysis, wherein a first stage analysis is an intra-row routing analysis and a second stage is an inter-row routing analysis. The method may also include generating (606) an optimized routing of the one or more unoptimized nets and displaying (608) the optimized routing at a graphical user interface.

Figure 7:
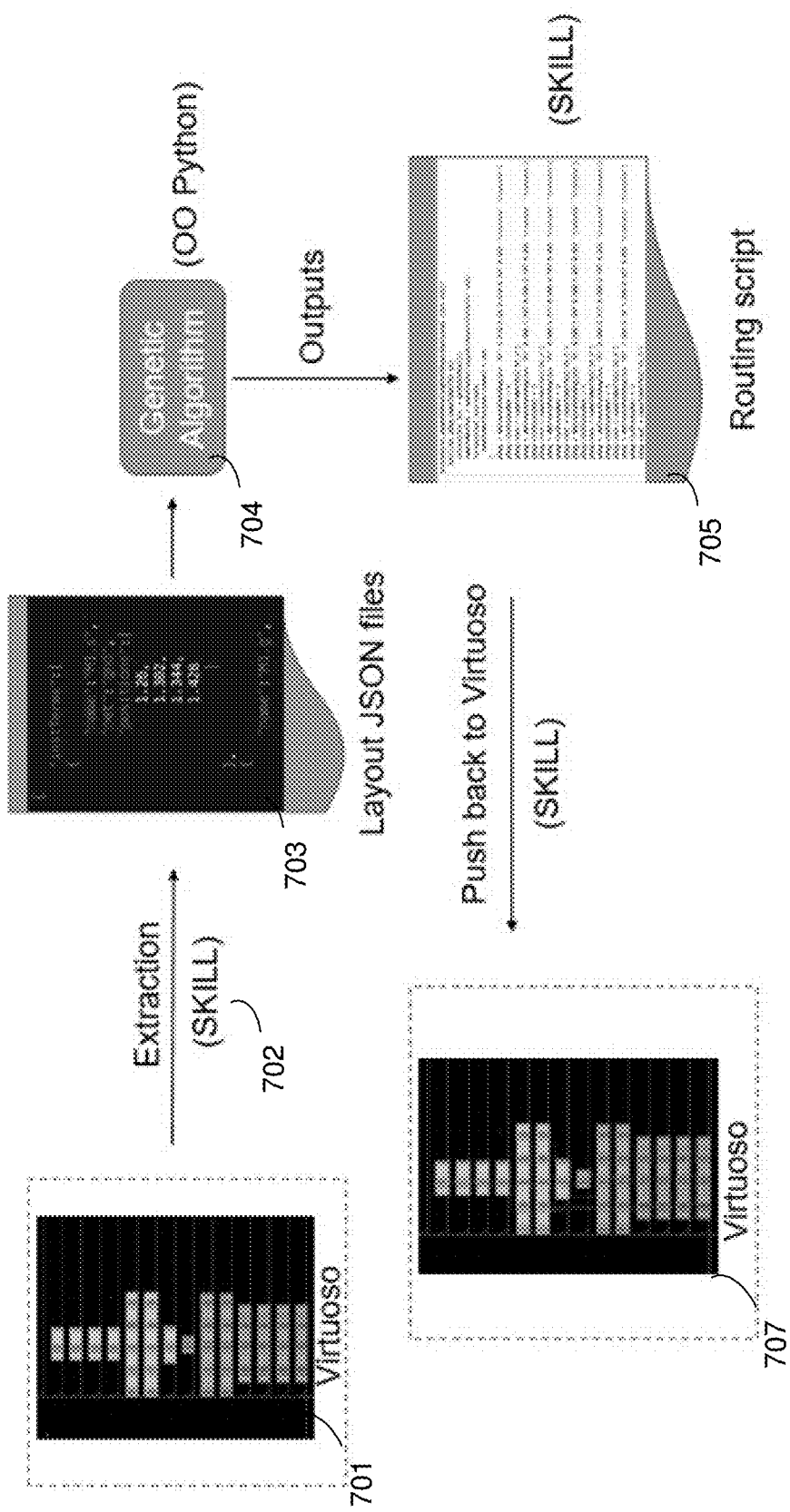
FIG. 7 is a diagram depicting aspects of a genetic routing process in accordance with an embodiment of the present disclosure.

Referring now to FIG. 7, an example flowchart showing operations consistent with genetic routing process 11 is provided. A graphical user interface 701 may be provided, which may include an unrouted layout. During the extraction phase 702 the nets that need to be routed, the available routing resource, as well as important characteristics of the instTerms including their connections and positions, and a proper formatting process for the genetic algorithm may all be determined. The information extracted may be represented as an intermediate representation 703 using any suitable format such as the layout JSON file example shown in FIG. 7. The genetic algorithm 704 may be applied and one or routing scripts 705 or a CSV file containing all routing track information may be generated as an output. Genetic routing process 11 may provide visualization and analysis using a graphical user interface and also generate a final routed layout 707 after tracks are determined.

In some embodiments, genetic routing process 11 may be configured to perform multi-stage routing, for example, intra-row routing and inter-row routing. For intra-row routing, for each row, genetic routing process 11 may be configured to apply the intra-row router to route nets in the row using resources in that row. Each net may result in several connected clusters of instTerms (e.g., 1 if the net is fully routed). For inter-row routing, genetic routing process 11 may begin with the partially routed layout from the previous stage and then apply the inter-row router to connect different clusters of the same net. In some embodiments, intra-row routing may be performed prior to inter-row routing.

Figure 8:
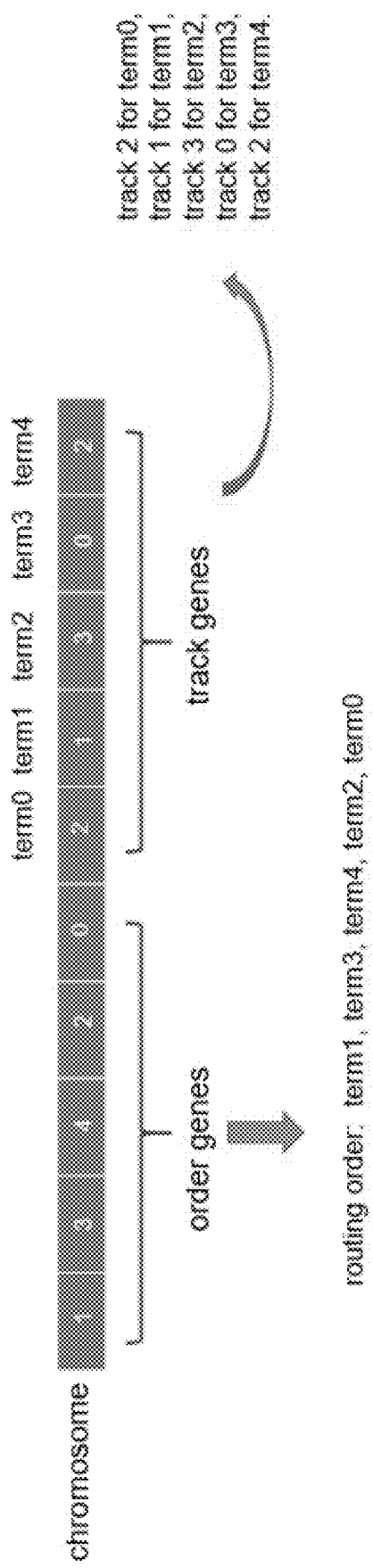
FIG. 8 is a diagram depicting aspects of a genetic routing process in accordance with an embodiment of the present disclosure.
Figure 9:
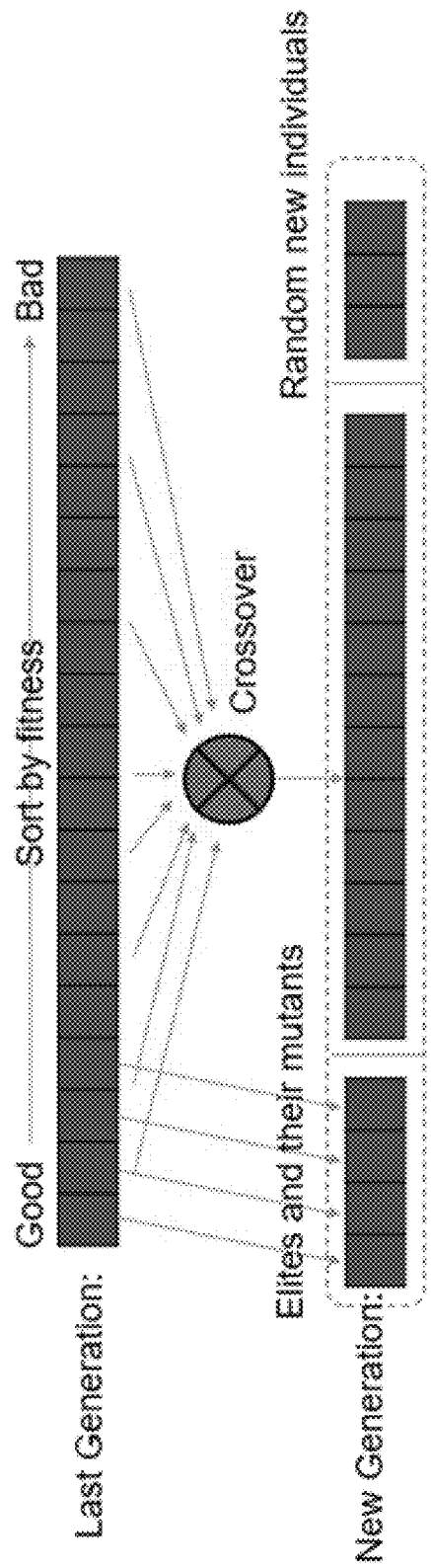
FIG. 9 is a diagram depicting aspects of a genetic routing process in accordance with an embodiment of the present disclosure.

Referring now to FIG. 8, an embodiment depicting an example of solution encoding associated with intra-row routing is provided. In this example, the chromosome may consist of two parts. The first part includes a sequence describing the routing order of terminals (e.g., instTerms) and the second part includes a set of track genes that determines which horizontal track to use to connect within an instTerm. Each layer may have its own track patterns, where each track pattern consists of a set of tracks distributed over the layout area. Or, in other words, a track may refer to a line segment in a preferred position and direction of a layer. An example showing intra-row routing evolution strategy is provided in FIG. 9.

Figure 10:
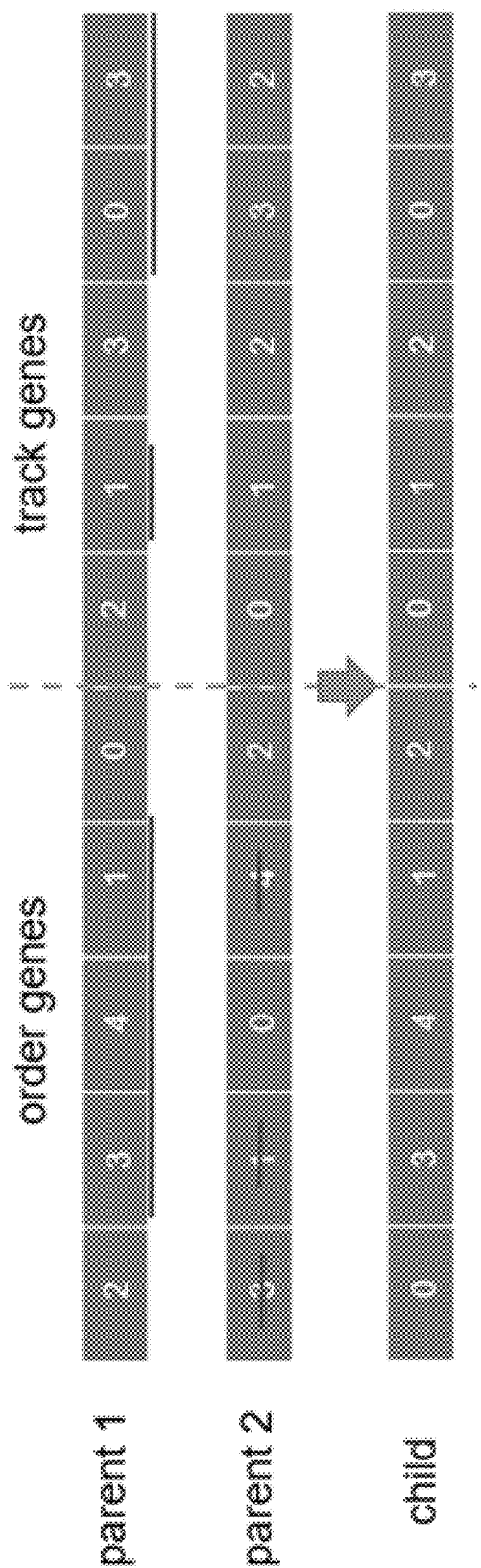
FIG. 10 is a diagram depicting aspects of a genetic routing process in accordance with an embodiment of the present disclosure.

Referring now to FIG. 10, an embodiment depicting an example of crossover and mutation associated with intra-row routing is provided. In operation, crossover may include selecting a sequence from parent 1, maintaining their order and tracking genes in the child. The process may include obtaining the terminals (e.g., instTerms) order and track genes from parent 2. Terminals may refer to the connections to a block. For example, the gate, source, and drain instTerms are connections to a device. In this example, parent 1 may be given preference as elite and parent 2 may be non-elite. For an elite mutation, the process may include randomly selecting an instTerm and changing its order in the order sequence. The process may also randomly select a track gene, or a group of track genes from the same net, and change it.

In some embodiments, intra-row routing may include a cost function, which may determine whether or not to impose a track penalty. For example, one possible cost function is provided below:

$$C = \omega_1 \cdot \text{numOpens} + \omega_2 \cdot \text{trackPenalty} + \omega_3 \cdot \text{wireLen}$$

If $net_i$ occupies $t_i$ horizontal tracks when connecting within its instTerms, its track penalty is $trackPenalty_i = t_i - 1$. The trackPenalty may indicate the sum of all nets' track penalty in the row. This example may include weighting values, for example, $\omega_1 > \omega_2 > \omega_3$. In some embodiments, "numOpens" may refer to the total number of opens for all nets, and "wireLen" may refer to the total length of all tracks used.

In some embodiments, intra-row routing may generate an initial solution, which may include sorting nets in descending order according to how many instTerms they need to connect. For instTerms on the same net, the process may sort according to x position. For instTerms sorted from the previous steps, tracks may be assigned. For each instTerm, the process may prefer tracks that other instTerms on the same net are assigned to. With respect to the first instTerm of a net, the process may prefer tracks that have already been assigned to other instTerms but are still available in its x range.

In some embodiments, an intra-row routing process may include a number of operations. As described below, the term "terms" may refer to the list of all instTerms, the term "seq" may refer to the list of order genes, and "tracks" may refer to the list of track genes. The first operation may include generating a track assignment for terms. For example, for i in seq, if tracks[i] is available, use it to connect terms[i]. The process may connect terms within a row. For i in seq, if there exists terms $(t_1, t_2, \ldots, t_K)$ on the same net as terms[i] with order before terms[i], try to connect terms[i] and the last term $t_K$.

Figure 11:
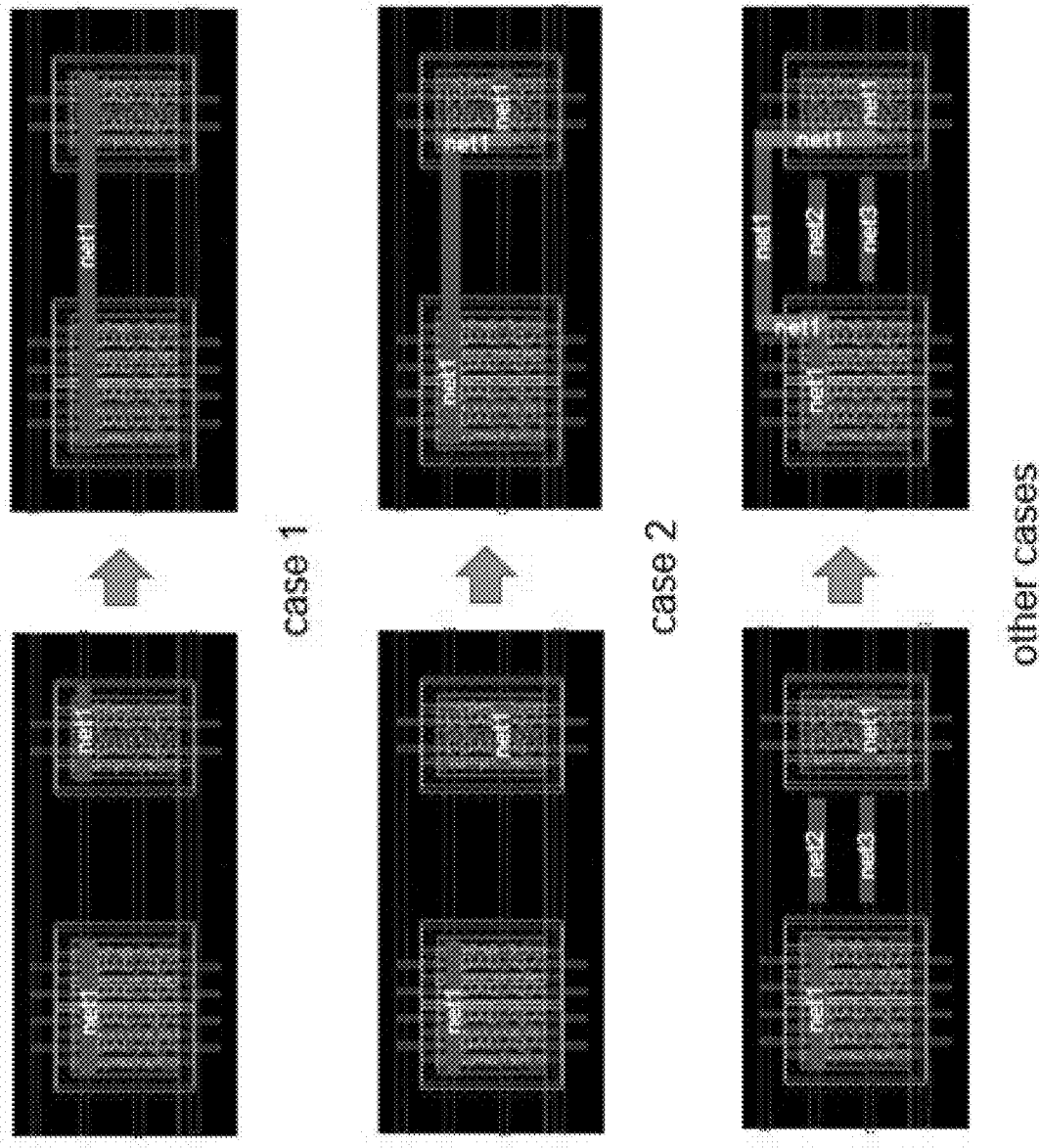
FIG. 11 is a diagram depicting aspects of a genetic routing process in accordance with an embodiment of the present disclosure.

Referring now to FIG. 11, an embodiment depicting intra-row routing strategy is provided. A number of use cases are shown in FIG. 11. In case 1, term1 and term2 may use the same track and it is available. As such, the process may connect them using that track. In case 2, term1 and term2 use different tracks, but may be connected by extending one existing track and adding a vertical track. For other cases, the process may use one horizontal track in the same row and two vertical tracks to connect them. If no such solution exists, the process may treat the term as unconnected.

Figure 12:
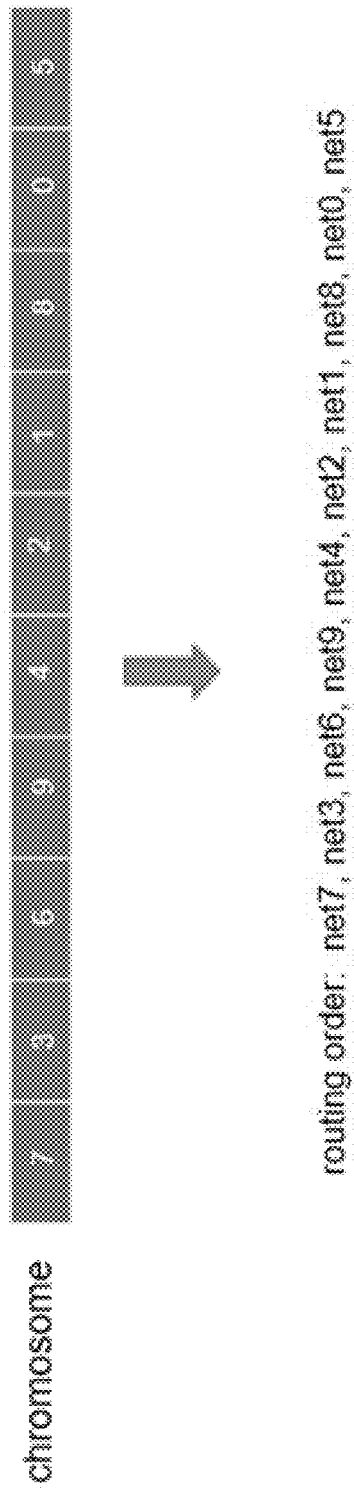
FIG. 12 is a diagram depicting aspects of a genetic routing process in accordance with an embodiment of the present disclosure.

Referring now to FIG. 12, an embodiment depicting solution encoding for an inter-row router is provided. In some embodiments, the process may encode the routing order of nets directly. The length of the chromosome may be the same as the number of nets. The evolution strategy for the inter-row router may be similar to that above as it may use the same crossover and elite mutation methods as the intra-row router. The primary difference being that the inter-row router's chromosome has no track genes. A new generation consists of elites from the previous generation, their mutants, child individuals generated from crossover, and random new individuals.

In some embodiments, the inter-row router may include its own cost function. An example cost function is provided below:

$$C = \omega_1 \cdot numOpens + \omega_2 \cdot wireLen$$

$\omega_1 > \omega_2$ since number of opens is more important

In some embodiments, an initial solution may be generated by sorting nets in descending order according to how many unconnected clusters they have. The nets with the higher number of unconnected clusters tend to be more difficult to route, as such, it may be beneficial to route them earlier.

In some embodiments, a routing process associated with an inter-row router may include a number of operations. Some operations may include pre-processing each net and determining how the instTerm clusters get connected. It should be noted that this may only be performed once and does not change with a different chromosome. For each net, the process may include obtaining all of its instTerm clusters, treating each cluster as a vertex and building a complete graph where the distance between vertex i and j is defined as:

$$dist[i][j] = \min(distance(x,y)), \text{ for } x \text{ in cluster } i \text{ and } y \text{ in cluster } j$$

In some embodiments, a minimum spanning tree may then be created. At this point, the process may then route with the sequence chromosome. For example, for each net in the sequence, for each edge (i, j) in its minimum spanning tree, obtain the corresponding clusters i and j. The process may then sort all instTerm pairs (x,y) in ascending order according to their distance, for x in cluster i and y in cluster j. For all pairs (x, y) from the previous step, the process may attempt to connect them until one pair is successfully connected.

Figure 13:
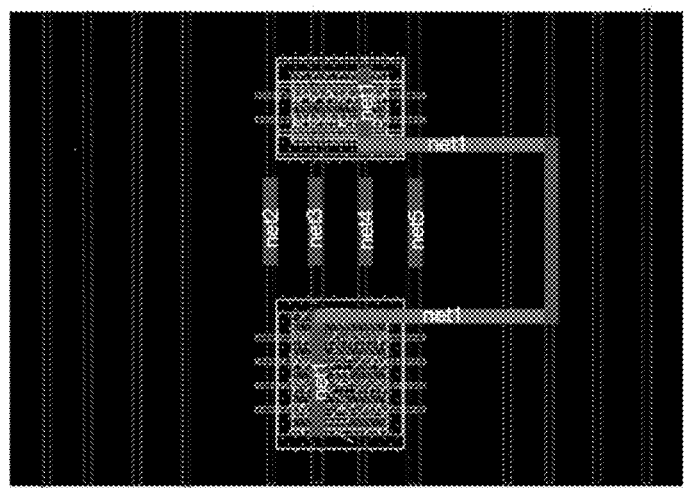
FIG. 13 is a diagram depicting aspects of a genetic routing process in accordance with an embodiment of the present disclosure.
Figure 13:
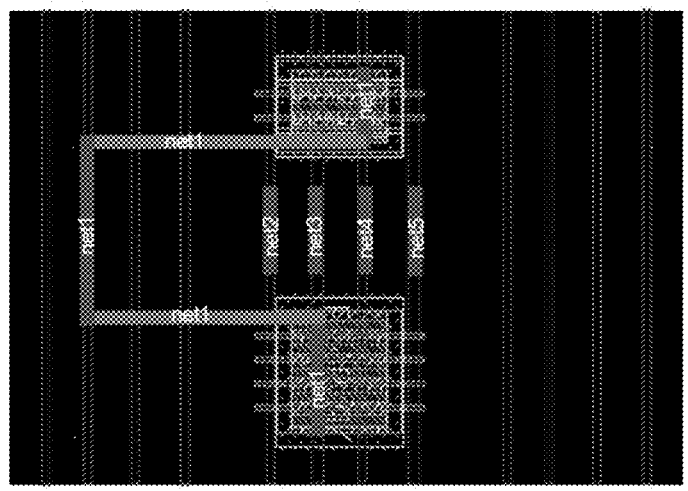
Figure 13:
Figure 13:
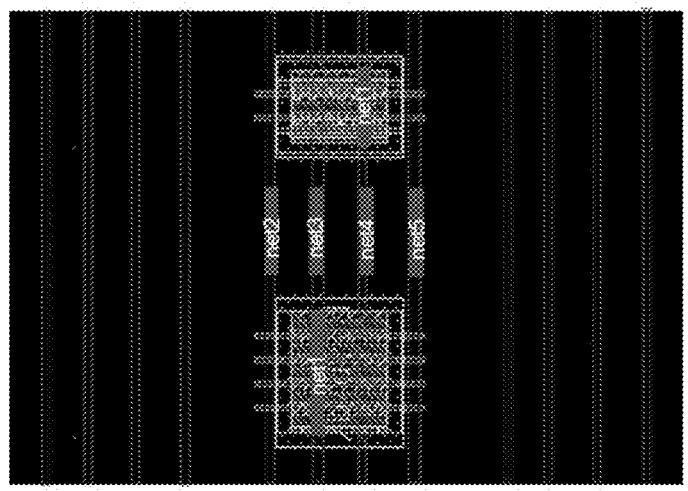

Referring now to FIG. 13, embodiments depicting examples of an inter-row router routing strategy are provided. FIG. 13 shows an example where instTerms are located in the same row. Here, the process may attempt to connect them using one horizontal track in the row directly above/below them and two vertical tracks.

Figure 14:
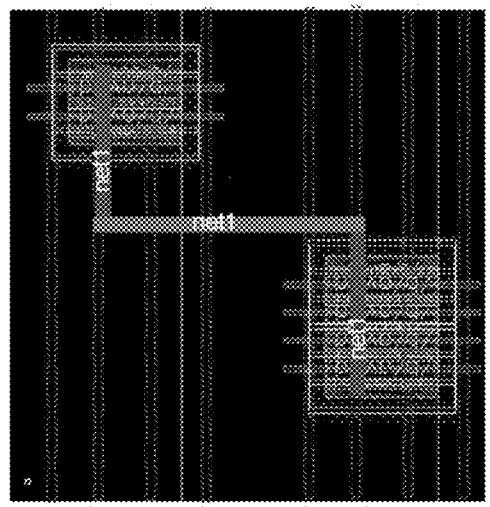
FIG. 14 is a diagram depicting aspects of a genetic routing process in accordance with an embodiment of the present disclosure.
Figure 14:
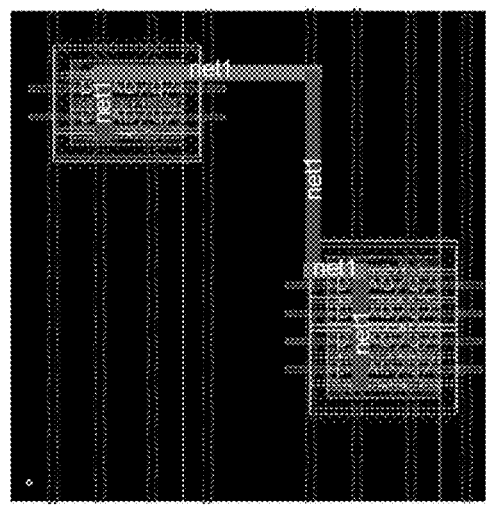
Figure 14:
Figure 14:
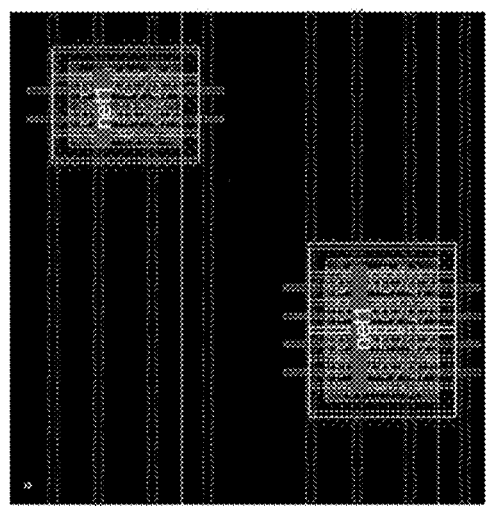

Referring now to FIG. 14, embodiments depicting examples of an inter-row router routing strategy are provided. FIG. 14 shows an example where instTerms are located in different rows. Here, the process may use one horizontal and two vertical tracks to connect them. In this example, the horizontal track is between the two instTerms' own tracks. The process may use one vertical and two horizontal tracks to connect them. The horizontal tracks may be obtained by extending the existing tracks of the two instTerms.

Figure 15:
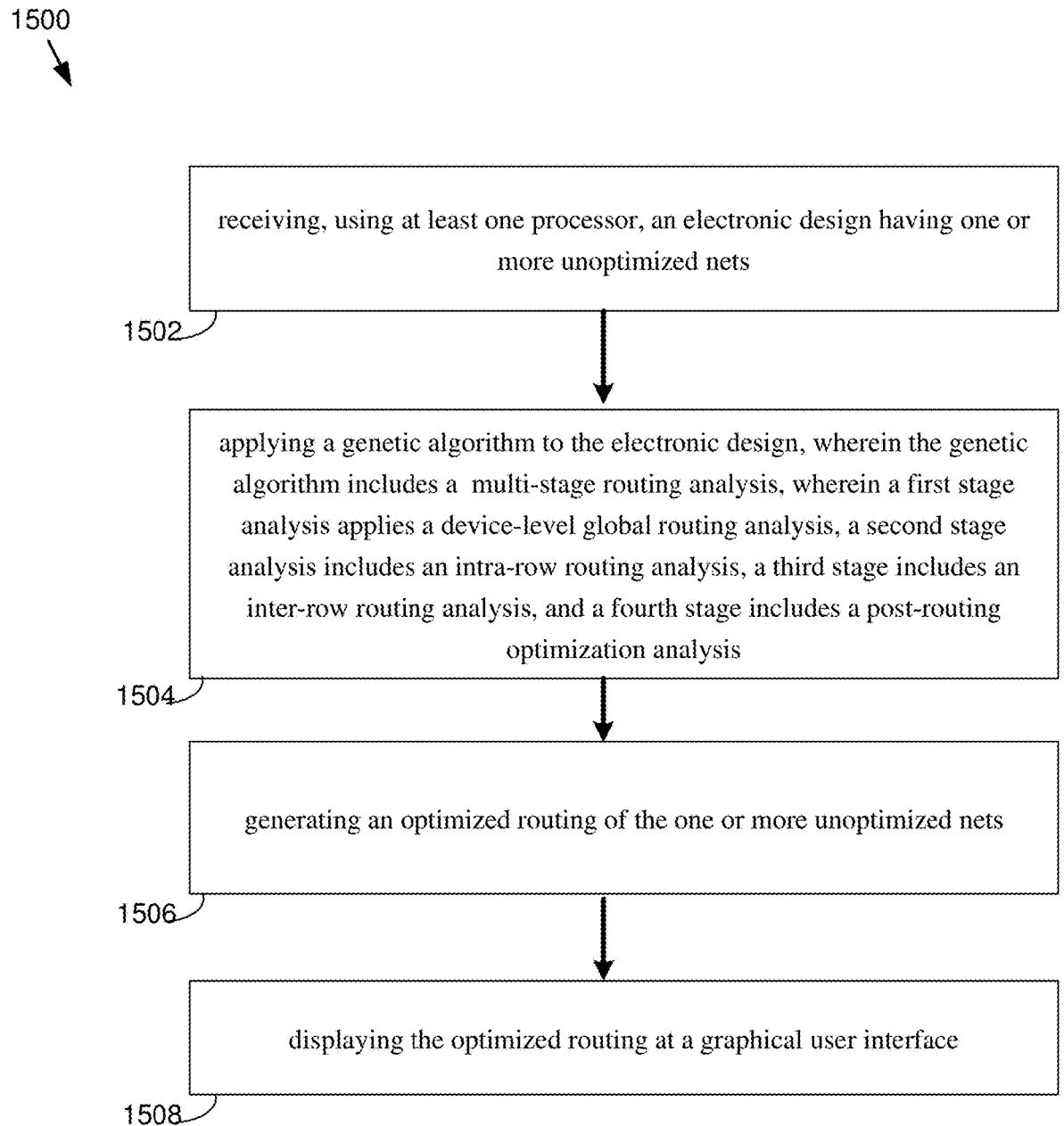
FIG. 15 is a flowchart depicting operations incorporating the multi-stage routing process in accordance with an embodiment of the present disclosure.

Referring now to FIGS. 15-29, embodiments directed towards a multi-stage routing process 13 are provided. FIG. 15 shows a flowchart including a number of operations consistent with one or more embodiments. As is discussed in further detail hereinbelow, multi-stage routing process 13 may include receiving 1502, using at least one processor, an electronic design having one or more unoptimized nets. The method may further include applying 1504 a genetic algorithm to the electronic design, wherein the genetic algorithm includes a multi-stage routing analysis. A first stage analysis may apply a device-level global routing analysis, a second stage analysis may include an intra-row routing analysis, a third stage may include an inter-row routing analysis, and a fourth stage may include a post-routing optimization analysis. The method may also include generating 1506 an optimized routing of the one or more nets and displaying 1508 the optimized routing at a graphical user interface. Numerous additional operations are also within the scope of the present disclosure.

Figure 16:
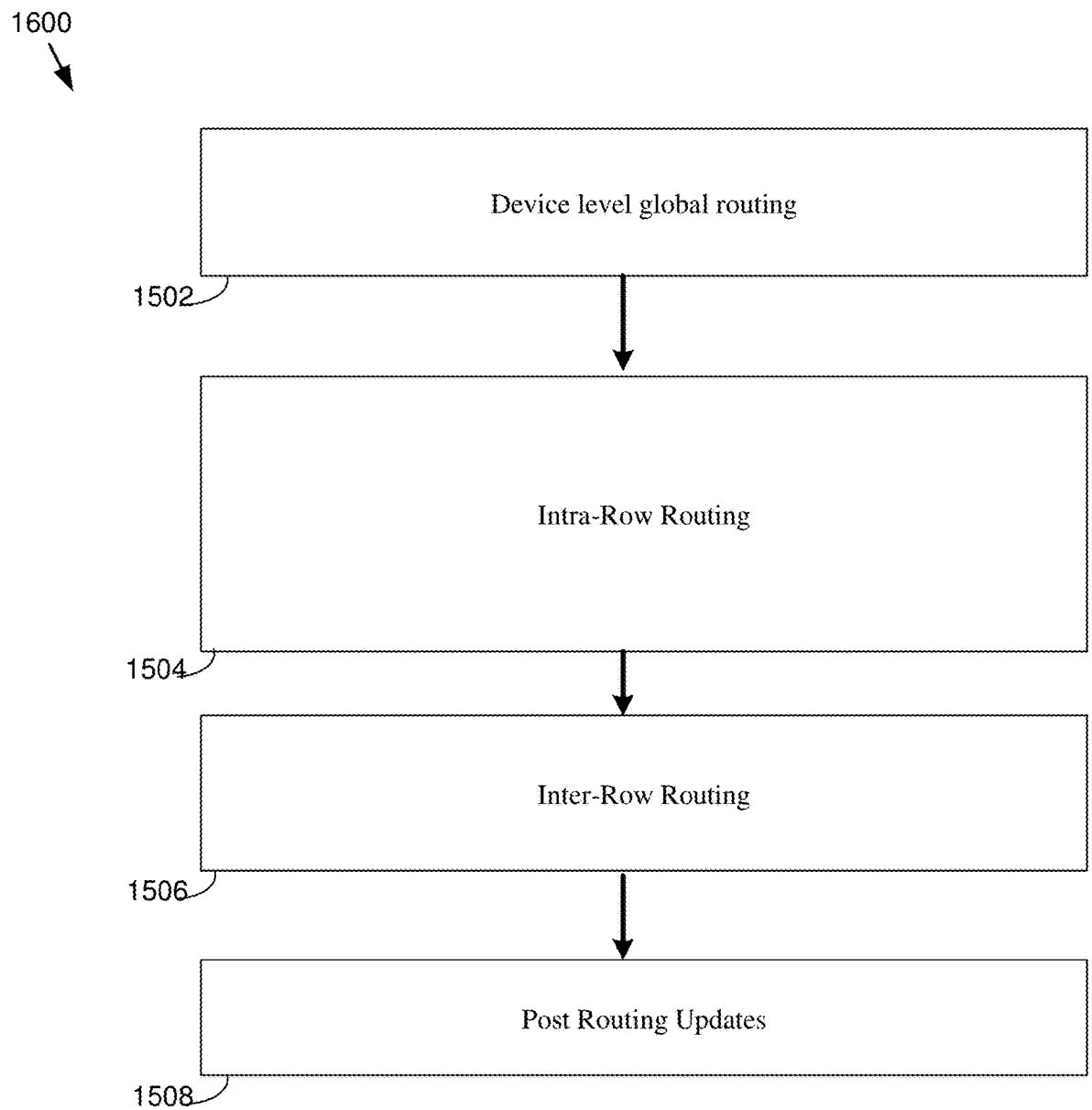
FIG. 16 is a flowchart depicting operations in accordance with an embodiment of the present disclosure.
Figure 17:
FIG. 17 is a graphical user interface in accordance with an embodiment of the present disclosure.

Referring now to FIG. 16, another flowchart including a number of operations consistent with one or more embodiments is provided. Some genetic routers may leave many opens and shorts in large designs and often do not consider spacing design rule checks ("DRC") during routing. Accordingly, embodiments included herein may use a four-stage genetic router with updated mutation and routing constraints to improve the routing results (including completion, short and DRC).

In some embodiments, multi-stage routing process 13 may include a four-stage routing process that may utilize a minimum spanning forest ("MSF") based connection pattern. The process may employ a hierarchical intra-row routing process as well as a "guided" mutation strategy and a device-based track assignment. Each of these is discussed in further detail hereinbelow. This approach may significantly improve routing results.

In some embodiments, multi-stage routing process 13 may utilize a device-level global routing process. Accordingly, the proposed router may use a device-level global router to represent the routing of a given layout as a series of two-point connection pairs. In this way, the global routing may calculate the minimum spanning forest for all nets, and then represent each tree as a set of connection pairs. The connection pairs from the global router may consist of both inter-row connections and intra-row connections. The weights between the inter-row and intra-row pairs may be parameterized based on a routing resource. An example GUI 1700 showing an example output from the global router is provided in FIG. 17.

Figure 18:
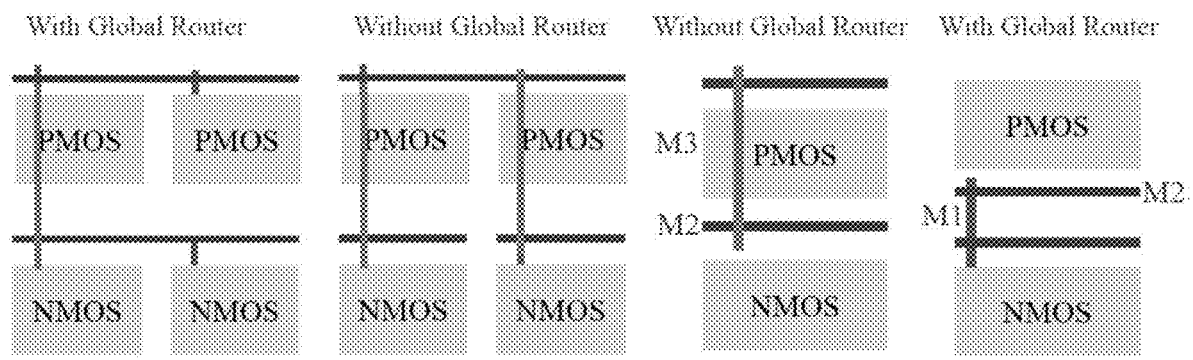
FIG. 18 is a diagram depicting aspects of a multi-stage routing process in accordance with an embodiment of the present disclosure.

Referring also to FIG. 18, a diagram showing an example comparing analysis both with and without the global router is provided. Compared to the random connection pattern in prior genetic algorithm routers, the global router used herein may help to eliminate most invalid connections to reduce the solution space, which improves algorithm efficiency with a given population number, for example 1. In some embodiments, the global router may provide information corresponding to inter-row routing while also performing intra-row routing. As a result, there are certain optimizations that may be performed to provide a more reasonable inter-row routing, for example 2.

Figure 19:
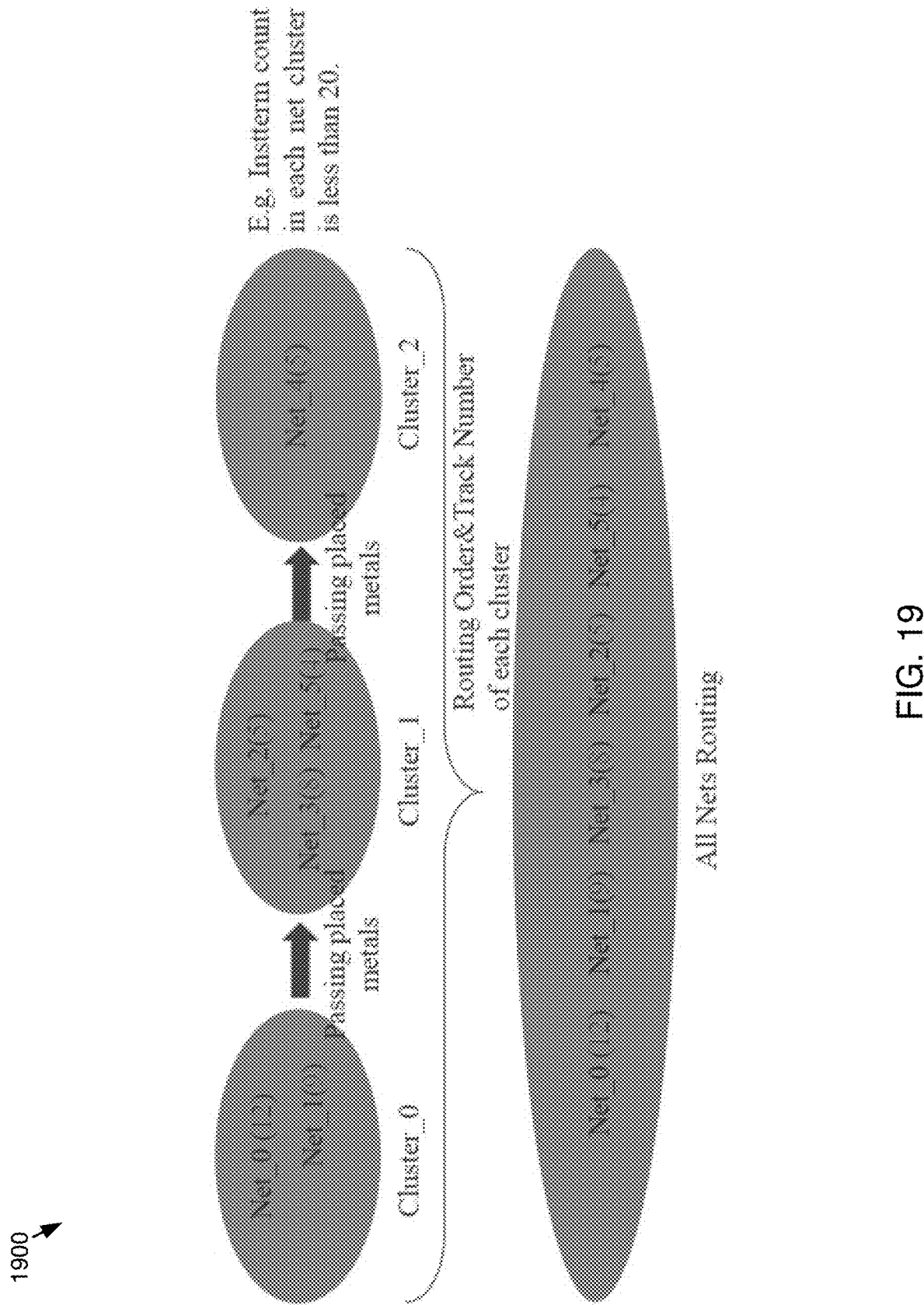
FIG. 19 is a diagram depicting aspects of a multi-stage routing process in accordance with an embodiment of the present disclosure.

Referring now to FIG. 19, a diagram depicting an example of hierarchical intra-row routing is provided. For device rows with a large number of connection pairs, multi-stage routing process 13 may perform a hierarchical intra-row routing analysis to improve algorithm efficiency. In operation, the process may be configured to divide all connection pairs into multiple net clusters based on their net name and instTerm amount. In some embodiments, the process may apply a genetic algorithm on each cluster in order and pass the most optimized routing result from the previous cluster to the subsequent cluster. After all net clusters are routed, multi-stage routing process 13 may apply a genetic algorithm on all connection pairs using the routing results from each cluster as an initial population (e.g., all net routing).

Figure 20:
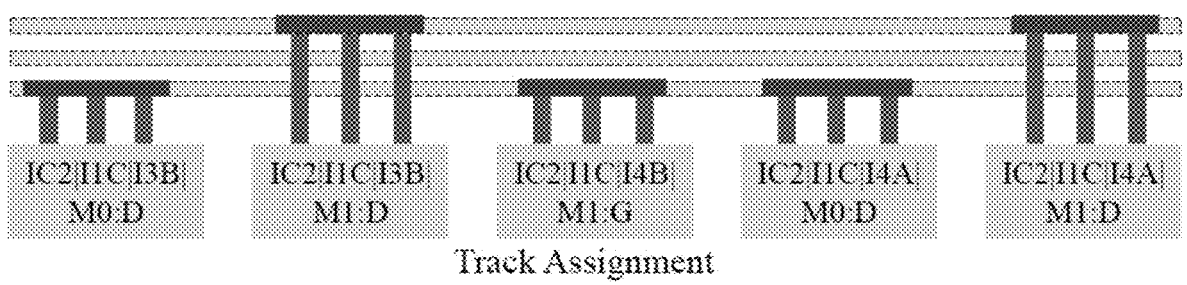
FIG. 20 is a diagram depicting aspects of a multi-stage routing process in accordance with an embodiment of the present disclosure.
Figure 20:
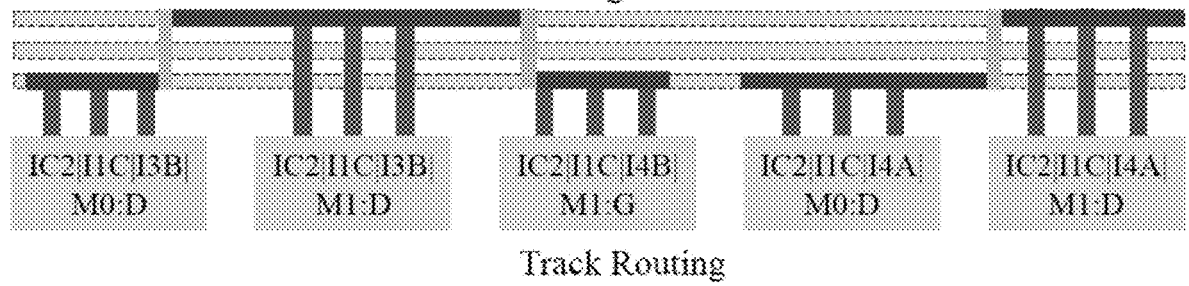

Referring now to FIG. 20, a diagram depicting another example of hierarchical intra-row routing is provided. In some embodiments, routing connection pairs may include multiple operations, some of which may include, but are not limited to track assignment and track routing. In a track assignment operation, the process may assign horizontal tracks to instTerms in each connection pair. The initial assignment may be randomly picked from all the valid tracks. In a track routing operation, the process may connect each connection pair in order.

Figure 21:
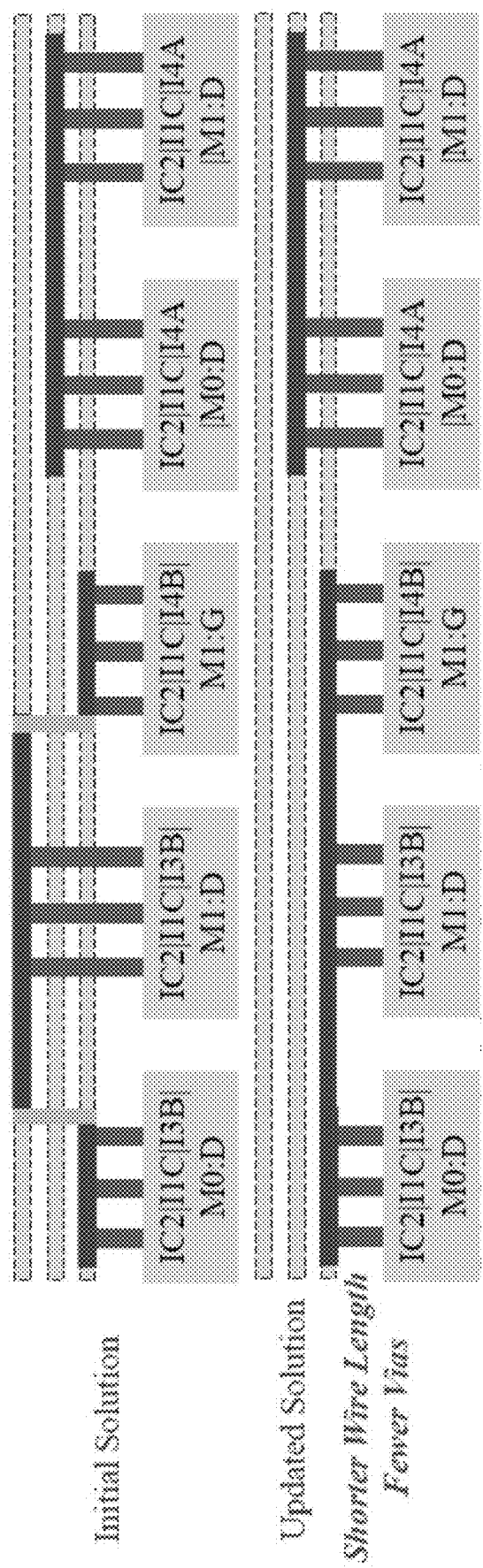
FIG. 21 is a diagram depicting aspects of a multi-stage routing process in accordance with an embodiment of the present disclosure.

Referring now to FIG. 21, a diagram depicting another example of hierarchical intra-row routing showing a genetic algorithm is provided. In some embodiments, during intra-row routing, multi-stage routing process 13 may use a genetic algorithm to optimize multiple factors. Some of these may include, but are not limited to, track assigned to instTerms (e.g., G, D, and S) and routing order of the connection pairs. The process may perform mutation and crossover on both routing order and track number to achieve a minimal cost function:

$$\text{Cost} = W_0 \times \text{Open} + W_1 \times \text{Wire\_Length} + W_2 \times H\_\text{Factor} + W_3 \times \text{Interrow\_Factor}$$

In the cost function example above, "weight value" may correspond to: $W_0 > W_3 > W_2 > W_1$, the "interrow_factor" may relate to a penalty to encourage placing track of connection pairs located in different rows close, and the "H_Factor" may refer to a penalty for routing with extra track during intra-row routing.

Referring now to FIG. 22, a diagram depicting another example of hierarchical intra-row routing showing mutation in net cluster routing is provided. In this example, the process may perform targeting on two types of instTerms in each chromosome as discussed below. In the first type, the instTerms result in opens (guided). For the routing order, multi-stage routing process 13 may start from connection pairs with open in the next generation (e.g., D2_D examples). In the second type, the instTerms may be randomly picked. Randomly changing the routing order (e.g., D2_S to D0_D). Instead of randomly picking some instTerms within a chromosome for mutation, the process may select the instTerms resulted in open for mutation. This is referred to herein as "guided" mutation.

Referring now to FIG. 23, a diagram depicting another example of hierarchical intra-row routing showing track crossover in net cluster routing is provided. In this example, for each generation, multi-stage routing process 13 may perform crossover on a given percentage of randomly picked chromosomes with a randomly picked "partner". Each chromosome may generate two children. As such, one may take Parent 0 order and the second may take Parent 1 order.

Referring now to FIG. 24, a diagram depicting another example of hierarchical intra-row routing showing mutation in all net routing is provided. In this example, the order mutation in all net routing may be the same as that in cluster routing. For track mutation, instead of only picking one instTerm, multi-stage routing process 13 may pick all instTerms in one device as the target. The devices may be chosen from randomly picked devices and devices with open (guided). In the event that there is any abutment in the target device, the abutted devices may be targeted for mutation as well (guided).

Referring now to FIG. 25, a diagram depicting another example of hierarchical intra-row routing showing track crossover in all net routing is provided. In this example, for each generation, a given percentage of the chromosome perform the crossover with a randomly picked "partner". Instead of obtaining the track of a single instTerm from the parents, now multi-stage routing process 13 may obtain the tracks for the entire device. In this example, each chromosome may generate two children. As such, one may take the order of Parent 0 and the other may take the order of Parent 1.

Figure 26:
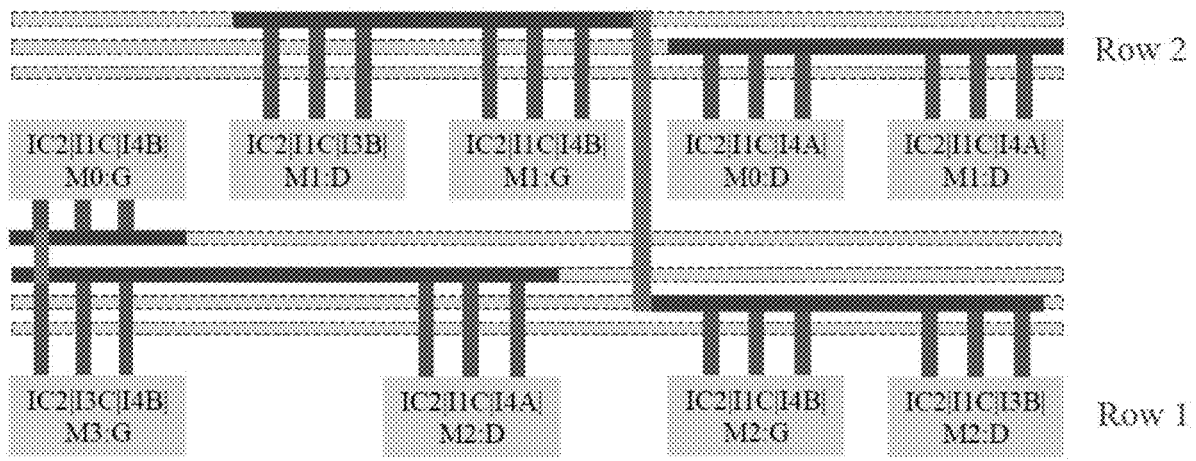
FIG. 26 is a diagram depicting aspects of a multi-stage routing process in accordance with an embodiment of the present disclosure.

Referring now to FIG. 26, a diagram depicting another example of inter-row routing is provided. Inter-row routing may implement connections between the instTerm pairs located in different rows and it may include a number of features as discussed below. For each row, multi-stage routing process 13 may select the best routing result from the genetic router and use the combination of all row results as the initial population. In some embodiments, the process may not change the track assignment of any instTerm during the inter-row routing. Through evolution, multi-stage routing process 13 may only perform the order mutation and crossover using a similar method as net cluster routing. In some embodiments, the system may only pick the best routing result of each row. However, the routing performance (e.g., wire length, etc.) may be further improved if the process selects multiple top results from each row and then find the most optimized combination and routing through evolution.

Figure 27:
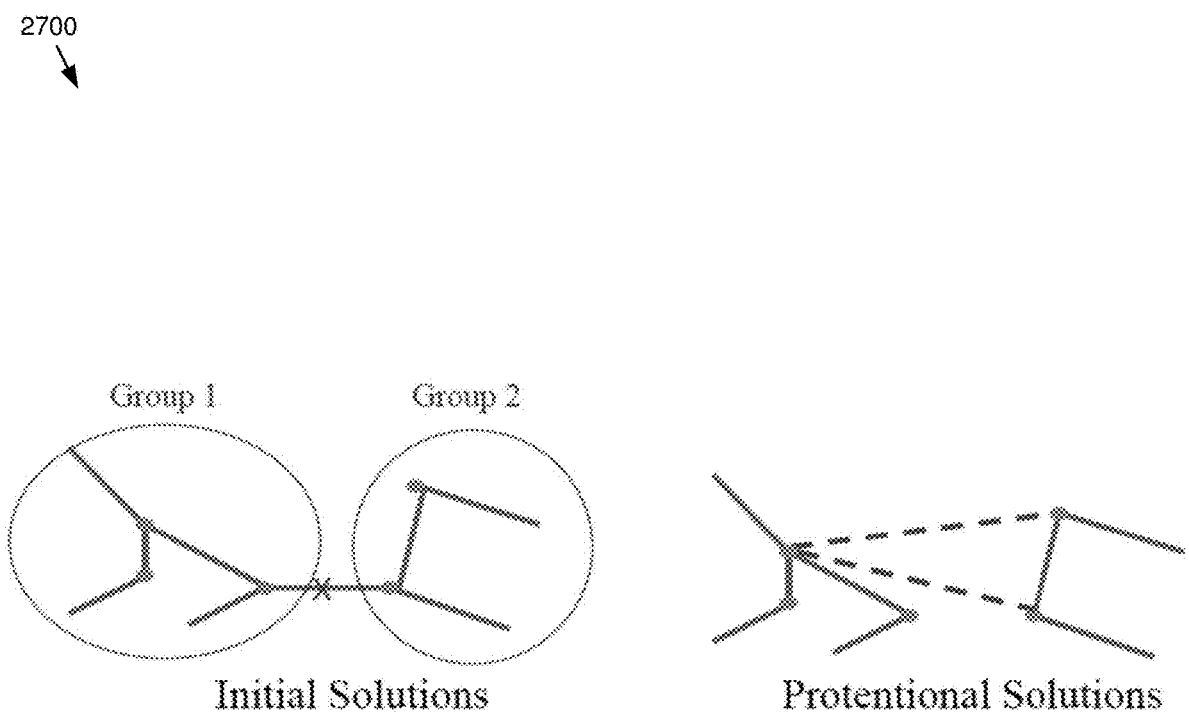
FIG. 27 is a diagram depicting aspects of a multi-stage routing process in accordance with an embodiment of the present disclosure.

Referring now to FIG. 27, an embodiment showing an example diagram of a post routing correction is provided. The global router may not be aware of any routing constraints during planning, so that the provided solution is not always routable in actuality. To address this, multi-stage routing process 13 may propose multiple post-routing fixes. The first may re-create a connection pair. Based on the solution from the global router, multi-stage routing process 13 may divide all the instTerms belonging to the same net into two groups, each of which includes one of the instTerms from a unrouteable connection pair. At this point, multi-stage routing process 13 may replace the unrouteable pair with any connection between two groups.

Figure 28:
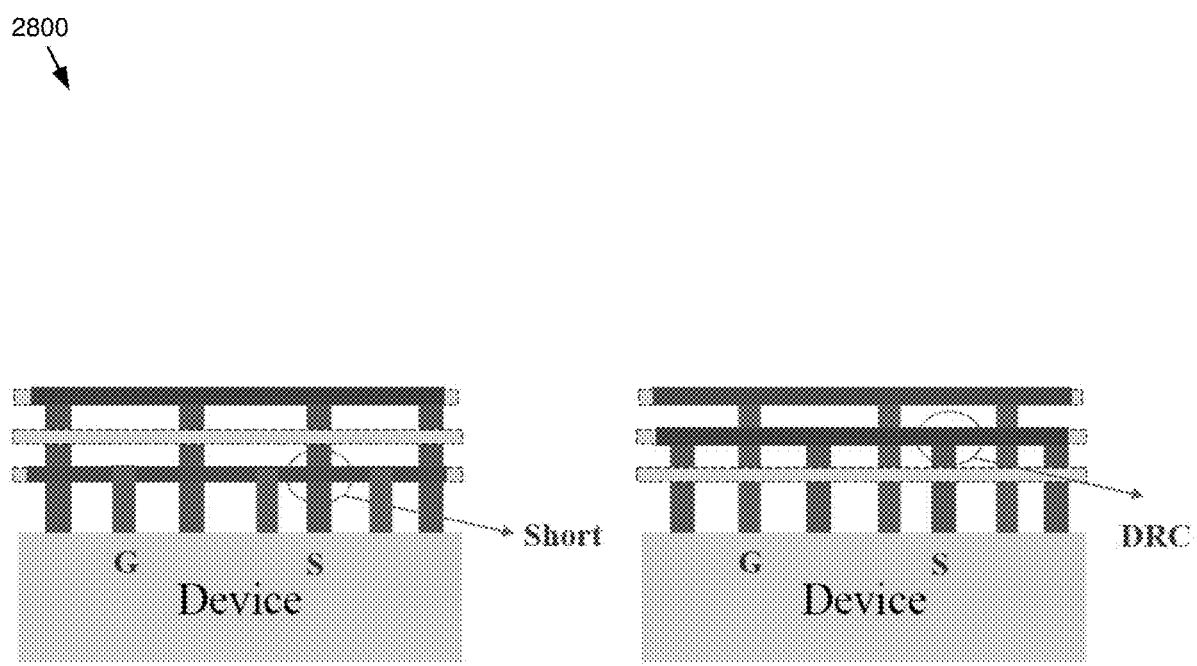
FIG. 28 is a diagram depicting aspects of a multi-stage routing process in accordance with an embodiment of the present disclosure.

Referring now to FIG. 28, an embodiment showing an example diagram of DRC preventions showing an example of device-based track assignment is provided. The track assignment for any instTerm not only depends on the track availability, but also on tracks assigned to the other instTerms belonging to the same device. The genetic router always keeps the record of assigned tracks of all instTerms, so that the track assigned to a given instTerm is only randomly picked from the valid track candidates.

Figure 29:
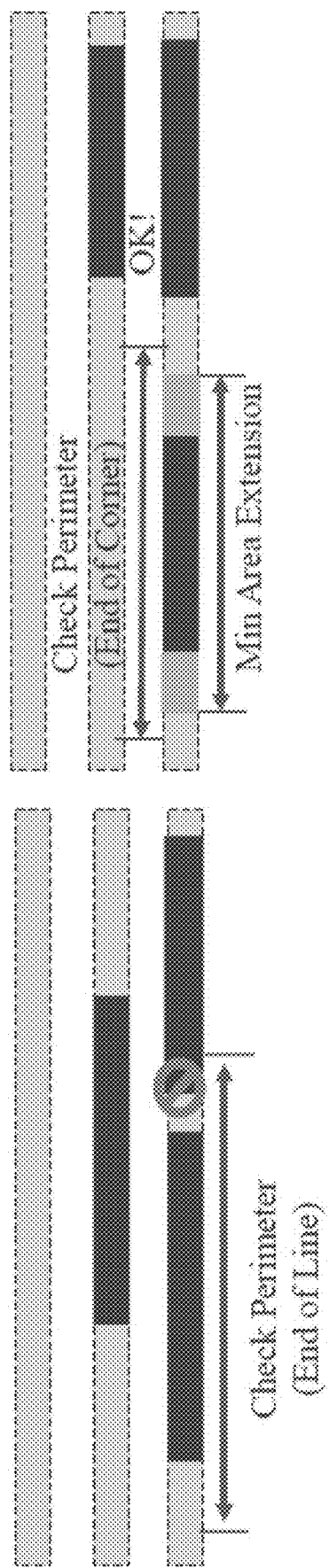
FIG. 29 is a diagram depicting aspects of a multi-stage routing process in accordance with an embodiment of the present disclosure.

Referring now to FIG. 29, an embodiment showing an example diagram depicting one or more DRC prevention techniques is provided. In operation, the genetic router may attempt to avoid most common DRC volitions using a variety of methods. For example, a proper WSP in each row may help to avoid most spacing violations between metal trunks on the adjacent tracks. While placing tracks during routing, the genetic router may check the target location with a "check perimeter". The genetic router may check the minimum area for each layer and extend the metal trunk to a proper size if necessary. In some embodiments, the genetic router may keep records of vias placed during routing, so that it may guarantee the spacing between vias to avoid DRCs. It should be noted that the genetic router and methods used to prevent DRCs may be pdk-independent. However, the concrete value such as "check perimeter" may be read from pdk files.

It should be noted that although certain embodiments included herein may reference machine learning or genetic algorithms, any analysis process may be used in accordance with the teachings of the present disclosure. For example, any evolutionary algorithm, genetic algorithm, genetic program, grouping genetic algorithm, evolutionary computing approach, metaheuristics, stochastic optimization, optimization approach, artificial intelligence technique, etc. may be used without departing from the teachings of the present disclosure.

Embodiments included herein may address the problems of device-level routing within analog flows. By providing an optimized routing solution while supporting multiple-width routing and avoiding DRCs, it may be used as an accurate initial solution for a detailed router to significantly reduce the routing iteration in many flows or be used as an estimation for routing results.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for electronic design comprising:
    receiving, using at least one processor, an electronic design having one or more unoptimized nets;
    applying a genetic algorithm to the electronic design, wherein the genetic algorithm includes a sequential multi-stage routing analysis, wherein a first stage analysis applies a device-level global routing analysis, a second stage analysis includes an intra-row routing analysis, a third stage includes an inter-row routing analysis, and a fourth stage includes a post-routing optimization analysis;
    generating an optimized routing of the one or more unoptimized nets; and
    displaying the optimized routing at a graphical user interface.

2. The computer-implemented method for electronic design of claim 1, wherein the device-level global routing analysis includes a router that represents a routing of a layout of the electronic design as a series of two point connection pairs.

3. The computer-implemented method for electronic design of claim 1, wherein the intra row routing analysis includes a hierarchical routing analysis.

4. The computer-implemented method for electronic design of claim 1, wherein the intra row routing analysis includes a first mutation operation for net cluster routing and a second mutation operation for all net routing.

5. The computer-implemented method for electronic design of claim 4, wherein at least one of the mutation operations includes a guided mutation operation.

6. The computer-implemented method for electronic design of claim 1, further comprising:
    performing a plurality of device based track assignment operations.

7. The computer-implemented method for electronic design of claim 1, wherein the genetic algorithm includes a cost function that includes a track placement penalty associated with a distance or a track placement penalty if one or more extra tracks are generated.

8. A computer-readable storage medium having stored thereon instructions, which when executed by a processor result in one of more operations for electronic design, the operations comprising:
    receiving, using at least one processor, an electronic design having one or more unoptimized nets;
    applying a genetic algorithm to the electronic design, wherein the genetic algorithm includes a sequential multi-stage routing analysis, wherein a first stage analysis applies a device-level global routing analysis, a second stage analysis includes an intra-row routing analysis, a third stage includes an inter-row routing analysis, and a fourth stage includes a post-routing optimization analysis;
    generating an optimized routing of the one or more unoptimized nets; and
    displaying the optimized routing at a graphical user interface.

9. The computer-readable storage medium of claim 8, wherein the device-level global routing analysis includes a router that represents a routing of a layout of the electronic design as a series of two point connection pairs.

10. The computer-readable storage medium of claim 8, wherein the intra row routing analysis includes a hierarchical routing analysis.

11. The computer-readable storage medium of claim 8, wherein the intra row routing analysis includes a first mutation operation for net cluster routing and a second mutation operation for all net routing.

12. The computer-readable storage medium of claim 11, wherein at least one of the mutation operations includes a guided mutation operation.

13. The computer-readable storage medium of claim 8, wherein operations further comprise:
performing a plurality of device based track assignment operations.

14. The computer-readable storage medium of claim 8, wherein the genetic algorithm includes a cost function that includes a track placement penalty associated with a distance or a track placement penalty if one or more extra tracks are generated.

15. A computing system including one or more processors and one or more memories configured to perform operations comprising:
receiving, using at least one processor, an electronic design having one or more unoptimized nets;
applying a genetic algorithm to the electronic design, wherein the genetic algorithm includes a sequential multi-stage routing analysis, wherein a first stage analysis applies a device-level global routing analysis, a second stage analysis includes an intra-row routing analysis, a third stage includes an inter-row routing analysis, and a fourth stage includes a post-routing optimization analysis;
generating an optimized routing of the one or more unoptimized nets; and
displaying the optimized routing at a graphical user interface.

16. The computing system of claim 15, wherein the device-level global routing analysis includes a router that represents a routing of a layout of the electronic design as a series of two point connection pairs.

17. The computing system of claim 15, wherein the intra row routing analysis includes a hierarchical routing analysis.

18. The computing system of claim 15, wherein the intra row routing analysis includes a first mutation operation for net cluster routing and a second mutation operation for all net routing.

19. The computing system of claim 15, further comprising:
performing a plurality of device based track assignment operations.

20. The computing system of claim 15, wherein the genetic algorithm includes a cost function that includes a track placement penalty associated with a distance or a track placement penalty if one or more extra tracks are generated.

* * * * *